(12) United States Patent
Chang et al.

(10) Patent No.: US 8,957,547 B2
(45) Date of Patent: Feb. 17, 2015

(54) UNINTERRUPTIBLE POWER SUPPLY

(75) Inventors: Kuo-Hsiang Chang, New Taipei (TW); Yu-Chi Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 497 days.

(21) Appl. No.: 13/428,014

(22) Filed: Mar. 23, 2012

(65) Prior Publication Data
US 2013/0169051 A1 Jul. 4, 2013

(30) Foreign Application Priority Data

Dec. 28, 2011 (TW) .............................. 100149363 A

(51) Int. Cl.
*H02J 9/00* (2006.01)
(52) U.S. Cl.
USPC .................. 307/66; 307/64; 307/65; 363/84; 323/271; 323/272; 323/273
(58) Field of Classification Search
CPC ...... H02J 9/062; H02M 7/217; H02M 3/1588
USPC .................. 307/64–66; 323/271–276; 363/84
See application file for complete search history.

(56) References Cited

U.S. PATENT DOCUMENTS

| | | | | |
|---|---|---|---|---|
| 5,612,581 A * | 3/1997 | Kageyama | ....................... | 307/64 |
| 8,174,856 B2 * | 5/2012 | Chapman | ....................... | 363/132 |
| 8,344,546 B2 * | 1/2013 | Sarti | ............................... | 307/64 |
| 8,723,362 B2 * | 5/2014 | Park et al. | ........................ | 307/66 |
| 2005/0143846 A1 * | 6/2005 | Kocher et al. | ................... | 700/34 |
| 2008/0285317 A1 * | 11/2008 | Rotzoll | ............................. | 363/80 |
| 2009/0021078 A1 * | 1/2009 | Corhodzic et al. | .............. | 307/67 |
| 2009/0296432 A1 * | 12/2009 | Chapuis | .......................... | 363/65 |
| 2010/0117449 A1 * | 5/2010 | Hartung et al. | ................. | 307/28 |
| 2010/0302819 A1 * | 12/2010 | O'Brien et al. | ................. | 363/95 |
| 2010/0327659 A1 * | 12/2010 | Lisi et al. | ......................... | 307/82 |
| 2011/0006607 A1 * | 1/2011 | Kwon et al. | ..................... | 307/66 |
| 2011/0144822 A1 * | 6/2011 | Choi | ............................ | 700/297 |
| 2011/0187200 A1 * | 8/2011 | Yin et al. | ........................ | 307/86 |
| 2013/0020872 A1 * | 1/2013 | Kinnard | ........................... | 307/64 |

* cited by examiner

*Primary Examiner* — Jared Fureman
*Assistant Examiner* — Alfonso Perez Borroto
(74) *Attorney, Agent, or Firm* — Novak Druce Connolly Bove + Quigg LLP

(57) ABSTRACT

An uninterruptible power supply (UPS) includes a rectifier, a buck converter, a solar energy module, a boost converter, a controller, and a power distribution unit (PDU). The solar energy module receives solar energy and converts the solar energy to a first DC voltage. The controller compares the first DC voltage with a preset voltage, and outputs a control signal to turn the boost converter on or off. When the boost converter is turned off, the rectifier receives an AC voltage from the AC power source and converts this to a rectified DC voltage which is output to the buck converter. When the boost converter is turned on, the boost converter converts the first DC voltage to a second DC voltage. The buck converter converts the rectified DC voltage or the first DC voltage to a working DC voltage and outputs to a power supply unit through the PDU.

8 Claims, 2 Drawing Sheets

UNINTERRUPTIBLE POWER SUPPLY

BACKGROUND

1. Technical Field

The present disclosure relates to uninterruptible power supplies.

2. Description of Related Art

An uninterruptible power supply (UPS) is a backup power supply that is connected between a power source and an electronic device. The UPS provides power to the electronic device when the power source is down. Some UPS may be connected to a mains alternating current (AC) power source and to a solar powered power source. To save cost the UPS switches from the mains power source to the solar power source when the solar module is charged (by sunlight) to a minimum voltage. The UPS switches back to the mains power source when the solar module drops below the minimum voltage. The switching is done by an electromagnetic relay. If the electromagnetic relay is switching very frequently it is liable to be damaged. Therefore, there is room for improvement in the art.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present embodiments.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
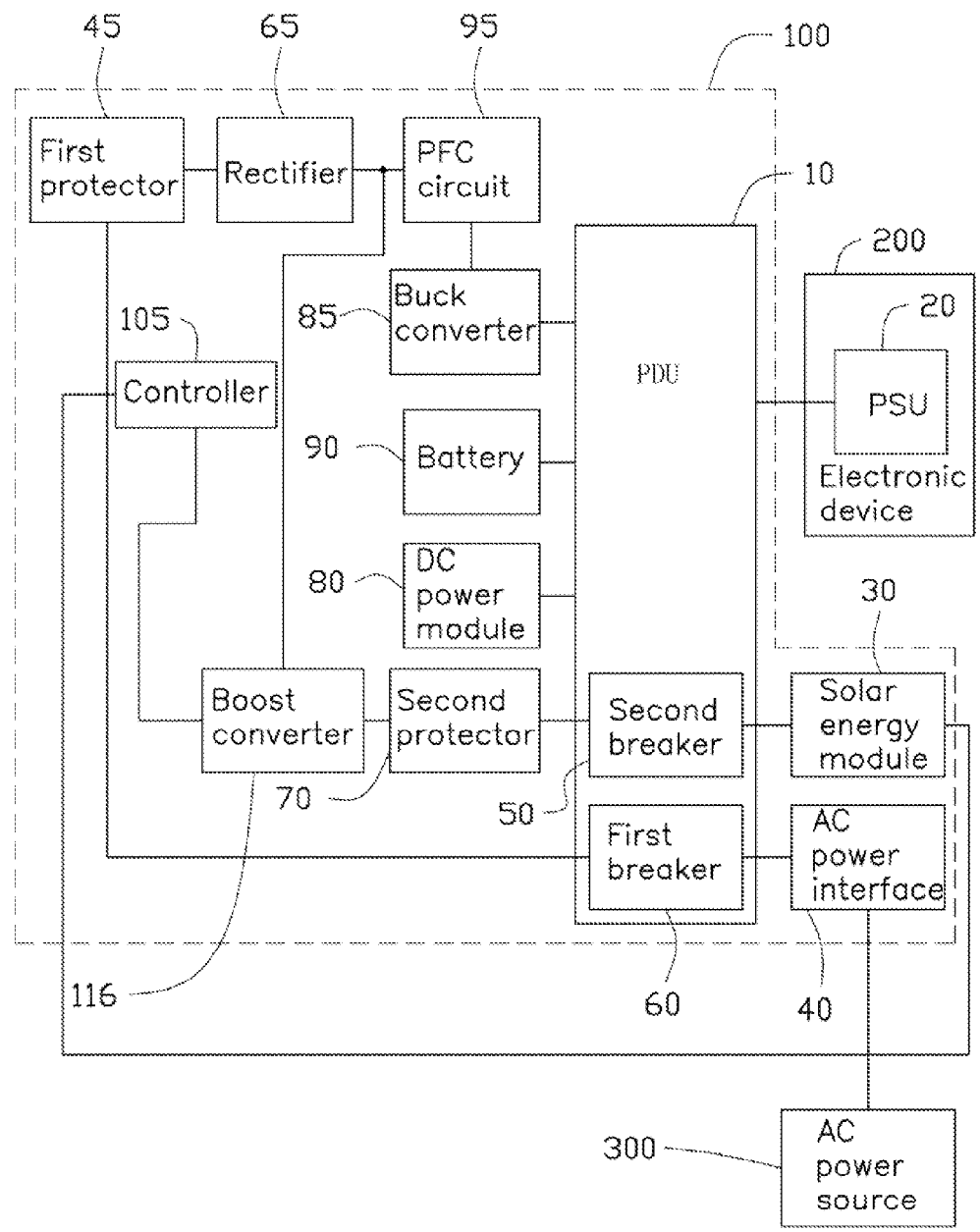
FIG. 1 is a block diagram of an uninterruptible power supply (UPS) in accordance with an exemplary embodiment of the present disclosure.

Referring to FIG. 1, an uninterruptible power supply (UPS) 100 is used for providing power to a power supply unit (PSU) 20 of an electronic device 200. The UPS 100 in accordance with an exemplary embodiment includes an alternating current (AC) power interface 40, a solar energy module 30, a battery 90, a direct current (DC) power module 80, first and second protectors 45 and 70, a controller 105, a boost converter 116, a rectifier 65, a power factor correction (PFC) circuit 95, a buck converter 85, and a power distribution unit (PDU) 10. The PDU 10 includes first and second breakers 50 and 60.

In one embodiment, the first and second breakers 50 and 60 are used for over-current protection. The first and second protectors 45 and 70 are electromagnetic relays. When an inrush current or a spike voltage of the UPS 100 is in over-current or over-voltage, the protectors 45 and 70 cut off, to protect the UPS 100.

The AC power interface 40 is connected to an AC power source 300. The AC power interface 40 is also connected to an input terminal of the rectifier 65 through the first breaker 60 and the first protector 45. An output terminal of the rectifier 65 is connected to an input terminal of the buck converter 85 through the PFC circuit 95. An output terminal of the buck converter 85 is connected to a first input terminal of the PDC 10. The solar energy module 30 is connected to an input terminal of the controller 105 and a first input terminal of the boost converter 116 through the second breaker 50 and the second protector 70. A second input terminal of the boost converter 116 is connected to an output terminal of the controller 105. An output terminal of the boost converter 116 is connected to the output terminal of the rectifier 65. The battery 90 is connected to a second input terminal of the PDU 10. The DC power module 80 is connected to a third input terminal of the PDU 10. An output terminal of the PDU 10 is connected to the PSU 20.

The solar energy module 30 converts the energy in light received into a first DC voltage, and outputs the first DC voltage to the controller 105 and the boost converter 116. The controller 105 compares the first DC voltage with a preset voltage, which represents a peak voltage of the AC power source 300, and outputs a first control signal when the first DC voltage is greater than the preset voltage or outputs a second control signal when the first DC voltage is less than the preset voltage. The boost converter 116 converts the first DC voltage to a second DC voltage and outputs the second DC voltage to the PFC circuit 95 when the first control signal is being received by the boost converter 116. The PFC circuit 95 regulates power factor of the second DC voltage and outputs the regulated DC voltage to the buck converter 85. The buck converter 85 converts the regulated DC voltage into a working DC voltage and outputs the working DC voltage to the PSU 20 through the PDU 10. The boost converter 116 is turned off when receiving the second control signal. Throughout, the rectifier 65 is receiving an AC voltage from the AC power source 300 through the AC power interface 40 and it converts the AC voltage to a rectified DC voltage, and outputs or not output the rectified DC voltage to the PFC circuit 95. The PFC circuit 95 regulates power factor of the rectified DC voltage and outputs the regulated DC voltage to the buck converter 85. The buck converter 85 converts the regulated DC voltage to the working DC voltage, which accords with a voltage requirement of the PSU 20, and outputs the working DC voltage to the PSU 20 through the PDU 10. The battery 90 and the DC power module 80 can provide voltages, which accords with a voltage requirement of the PSU 20 to the PSU 20 through the PDU 10, when the solar energy module 30 and the AC power source 300 do not output voltages.

Figure 2:
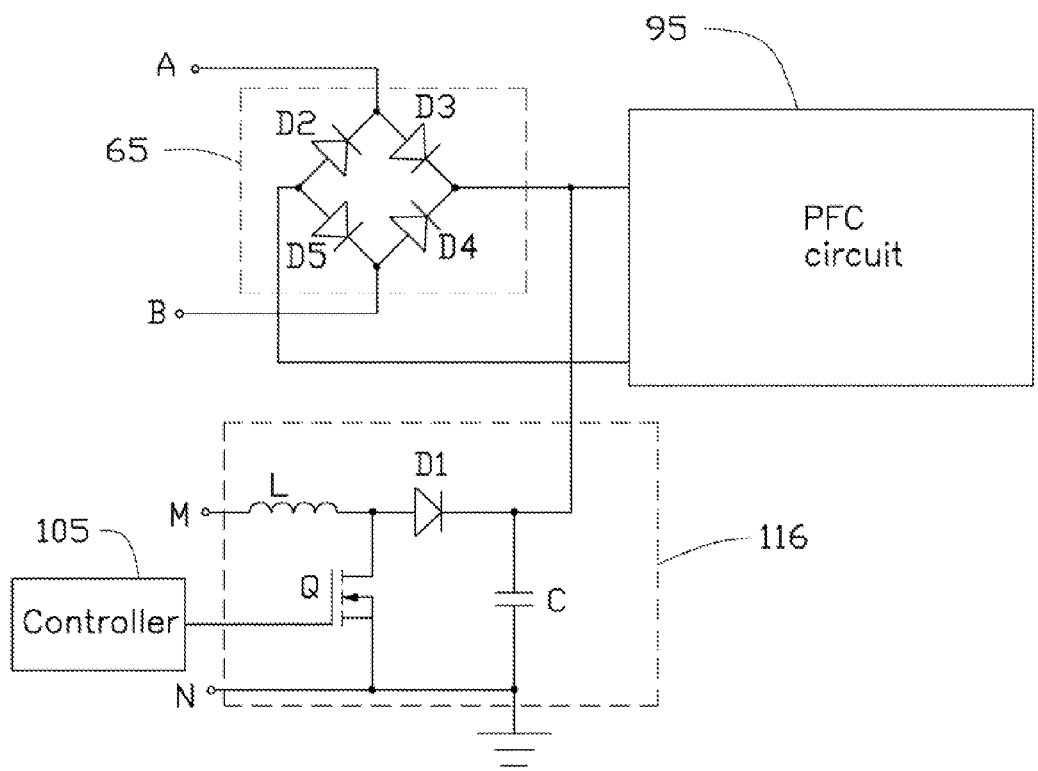
FIG. 2 is a circuit diagram of the UPS of FIG. 1.

Referring to FIG. 2, the rectifier 65 includes diodes D2-D5 and voltage input terminals A and B. The voltage input terminals A and B are connected to the first protector 45. A cathode of the diode D2 is connected to the voltage input terminal A and to an anode of the diode D3. A cathode of the diode D5 is connected to the voltage input terminal B and to an anode of the diode D4. Cathodes of the diodes D3 and D4 are connected to a first input terminal of the PFC 95. Anodes of the diodes D2 and D5 are connected to a second input terminal of the PFC 95.

The boost converter 116 includes voltage input terminals M and N, an inductor L, a field effect transistor (FET) Q, a diode D1, and a capacitor C. The voltage input terminals M and N are connected to the second protector 70. A gate of the FET Q is connected to the controller 105. A drain of the FET Q is connected to the voltage input terminal M through the inductor L and an anode of the diode D1. A source of the FET Q and the voltage input terminal N are grounded. A cathode of the diode D1 is grounded through the capacitor C and also connected to the cathode of the diode D3.

In use, when the first DC voltage output from the solar energy module 30 is less than the preset voltage, the controller 105 outputs the second control signal, such as a low level signal to the gate of the FET Q, and the FET Q is turned off. Thus the boost converter 116 turns off. At the same time, the rectifier 65 receives the AC voltage from the AC power source 300 and converts the AC voltage to the rectified DC voltage and outputs the rectified DC voltage to the PFC circuit 95. The PFC circuit 95 regulates power factor of the rectified DC voltage and outputs the regulated DC voltage to the buck converter 85. The buck converter 85 converts the regulated DC voltage to the working DC voltage and outputs the working DC voltage to the PSU 20 through the PDU 10. Specifically, the AC power source 300 will provide power to the PSU 20 when the first DC voltage output from the solar energy module 30 is less than the preset voltage.

When the first DC voltage output from the solar energy module 30 is greater than the preset voltage, the controller 105 outputs the first control signal, such as a high level signal to the gate of the FET Q, and the FET Q is turned on. The boost converter 116 converts the first DC voltage output from the solar energy module 30 to the second DC voltage and outputs the second DC voltage to the PFC 95. Since the second DC voltage is greater than the preset voltage, it is greater than a voltage at the cathodes of diodes D3 and D4, thus, the diodes D3 and D4 are turned off. The rectified DC voltage output from the AC power source 300 is therefore not output to the PFC 95. The PFC circuit 95 regulates power factor of the second DC voltage and outputs the regulated DC voltage to the buck converter 85. The buck converter 85 converts the regulated DC voltage to the working DC voltage and outputs the working DC voltage to the PSU 20 through the PDU 10. Specifically, the solar energy module 30 will provide power to the PSU 20 when the first DC voltage being output from the solar energy module 30 is greater than the preset voltage.

The UPS 100 allows the solar energy module 30 to provide power to the PSU 20 through the DC converter 116 when the first DC voltage output from the solar energy module 30 is greater than a preset voltage, or the UPS 100 allows the AC power source 300 to provide power to the PSU 20 when the first DC voltage output from the solar energy module 30 is less than the preset voltage, and may allow one in substitution for the other on an instantaneous basis. This will avoid any switching between the AC power source 300 and the solar energy module 30 by electromagnetic relay.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An uninterruptible power supply (UPS) applicable to a power supply unit (PSU) of an electronic device, the UPS comprising:

an alternating current (AC) power interface connected to an AC power source;

a rectifier converting an AC voltage received from the AC power interface to a rectified direct current (DC) voltage;

a solar energy module receiving solar energy and converting the solar energy to a first DC voltage;

a controller comparing the first DC voltage with a preset voltage which is a peak voltage of the AC power source, and outputting a control signal;

a boost converter controlled by the control signal, wherein when the first DC voltage is less than the preset voltage, the boost converter turns off; when the first DC voltage is greater than the preset voltage, the boost converter converts the first DC voltage to a second DC voltage;

a buck converter converting the rectified DC voltage or the second DC voltage to a working DC voltage according to a voltage requirement of the PSU of the electronic device; and a power distribution unit connected to the buck converter to receive the working DC voltage and output to the PSU.

2. The UPS of claim 1, wherein the PDU comprises first and second breakers for over-current protection, the first breaker is connected between the AC power interface and the rectifier, the second breaker is connected between the solar energy module and the boost converter.

3. The UPS of claim 2, further comprising first and second protectors for over-current and over-voltage protection, wherein the first protector is connected between the first breaker and the rectifier, the second protector is connected between the second breaker and the boost converter.

4. The UPS of claim 3, wherein the rectifier comprises first to fourth diodes and first and second voltage input terminals, the first and second voltage input terminals are connected to the first protector, a cathode of the first diode is connected to the first voltage input terminal and an anode of the second diode, a cathode of the fourth diode is connected to the second voltage input terminal and an anode of the third diode, cathodes of the second and third diodes and the anodes of the first and fourth diodes are connected to the buck converter.

5. The UPS of claim 4, wherein the boost converter comprises an inductor, a field effect transistor (FET), a fifth diode, a capacitor, third and fourth voltage input terminal connected to the second protector, a gate of the FET is connected to the controller, a drain of the FET is connected to the third voltage input terminal through the inductor and an anode of the fifth diode, a source of the FET and the fourth voltage input terminal are grounded, a cathode of the fifth diode is connected to the cathode of the second diode and also grounded through the capacitor.

6. The UPS of claim 5, further comprising a power factor correction circuit (PFC), wherein a first input terminal of the PFC is connected to the cathodes of the second and third diodes, a second input terminal of the PFC is connected to the cathode of the fifth diode.

7. The UPS of claim 1, further comprising a DC power module connected to the PDU.

8. The UPS of claim 1, further comprising a battery connected to the PDU.

* * * * *